United States Patent [19]

Richards et al.

[11] 3,942,884
[45] Mar. 9, 1976

[54] INTERACTIVE AUDIO-VISUAL APPARATUS

[75] Inventors: Victor Richards, San Francisco; Jiri M. Nessel, Palo Alto; Arno Parik, San Francisco, all of Calif.

[73] Assignee: Victor Richards, San Francisco, Calif.

[22] Filed: Dec. 5, 1973

[21] Appl. No.: 421,987

[52] U.S. Cl. .................... 353/9; 353/16; 350/135; 350/138
[51] Int. Cl.² ........................................ G03B 21/04
[58] Field of Search .................. 353/7–9, 15–19; 40/28.1; 274/14; 350/135, 138

[56] References Cited
UNITED STATES PATENTS

| | | | |
|---|---|---|---|
| 3,048,083 | 8/1962 | Rosenbaum | 353/10 |
| 3,138,061 | 6/1964 | Greenaway | 353/17 |
| 3,389,636 | 6/1968 | Weitzner et al. | 353/19 X |
| 3,432,230 | 3/1969 | Glass et al. | 353/7 X |
| 3,436,083 | 4/1969 | Elwell | 274/14 |
| 3,480,356 | 11/1969 | Dimitracopoulos | 353/19 |
| 3,484,160 | 12/1969 | Glass et al. | 353/7 |

Primary Examiner—Richard E. Aegerter
Assistant Examiner—Michael H. Thaler
Attorney, Agent, or Firm—Phillips, Moore, Weissenberger, Lempio & Strabala

[57] ABSTRACT

A device for the viewing of photo-images and the presentation of sound recordings corresponding to such photo-images, which device may be controlled by the user to provide substantially random access to any photo-image and the sound recording corresponding thereto, is disclosed. A modular construction of such device and its adaptability to either hand-held or projection embodiments is described. A novel tone arm system as well as a novel turntable driving mechanism, a novel disc type record unit and a novel record changing mechanism is disclosed. In addition, a novel stereoscopic system based on the use of two identical views of the field of vision is disclosed and a specific optical system is described. Finally, a method of and means for coordinating a group of photo-images and a group of sound recordings so that selection of a particular photo-image automatically selects the corresponding sound recording is disclosed.

8 Claims, 14 Drawing Figures

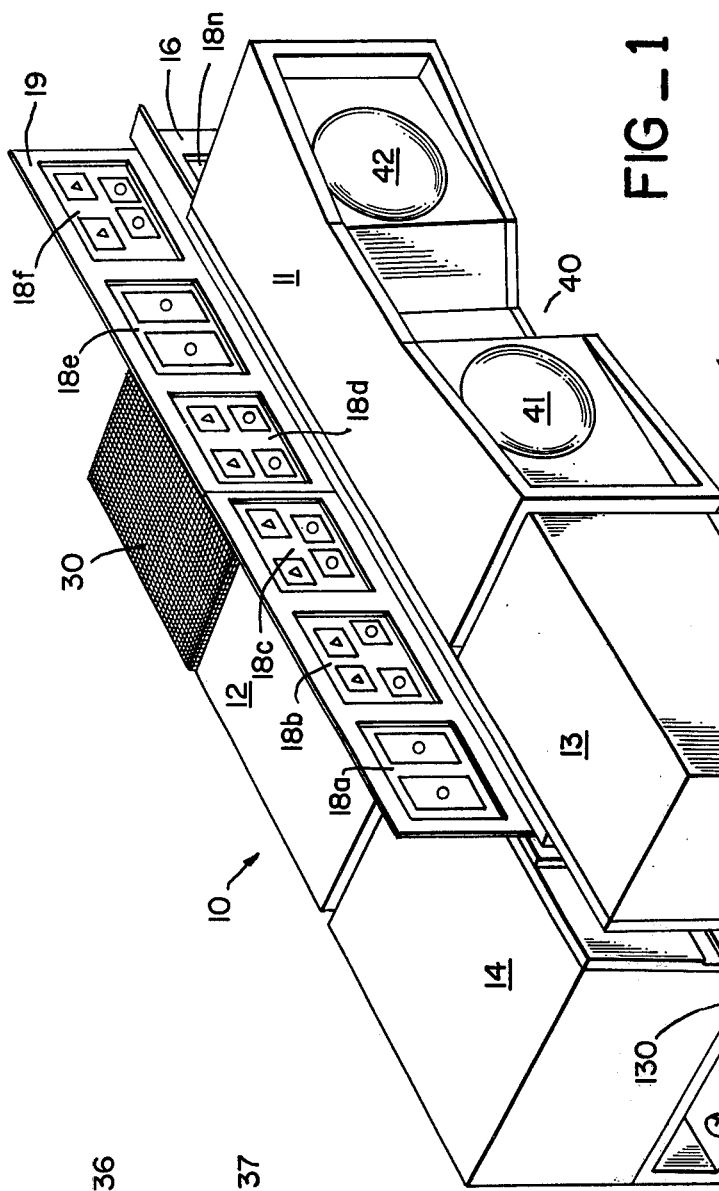
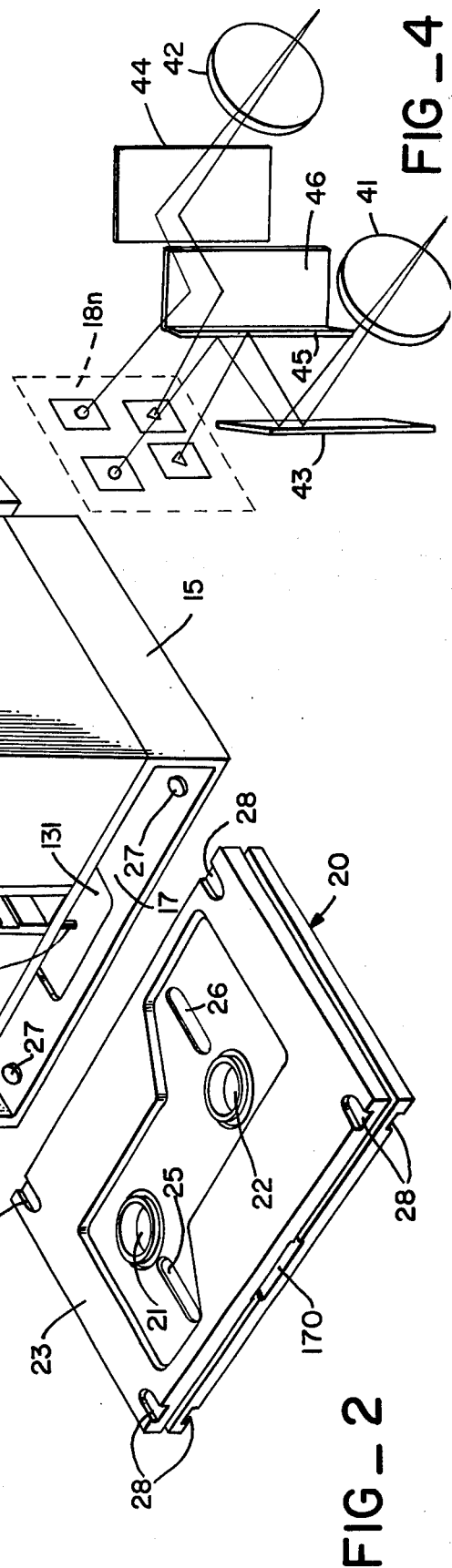
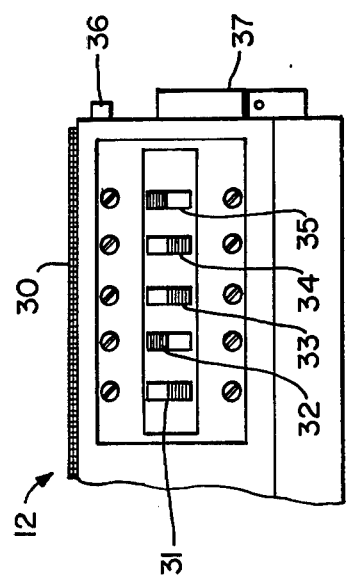

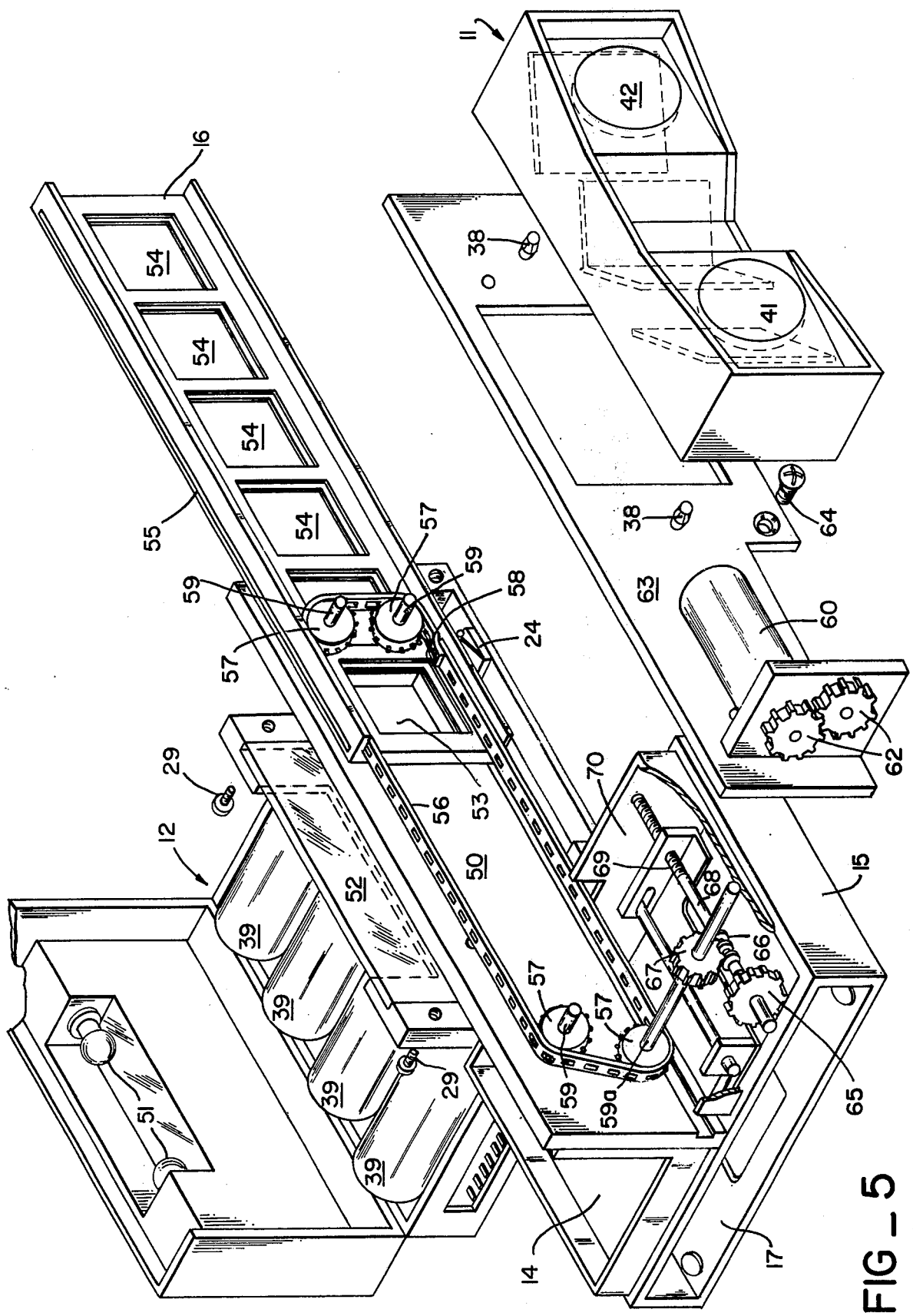
FIG_5

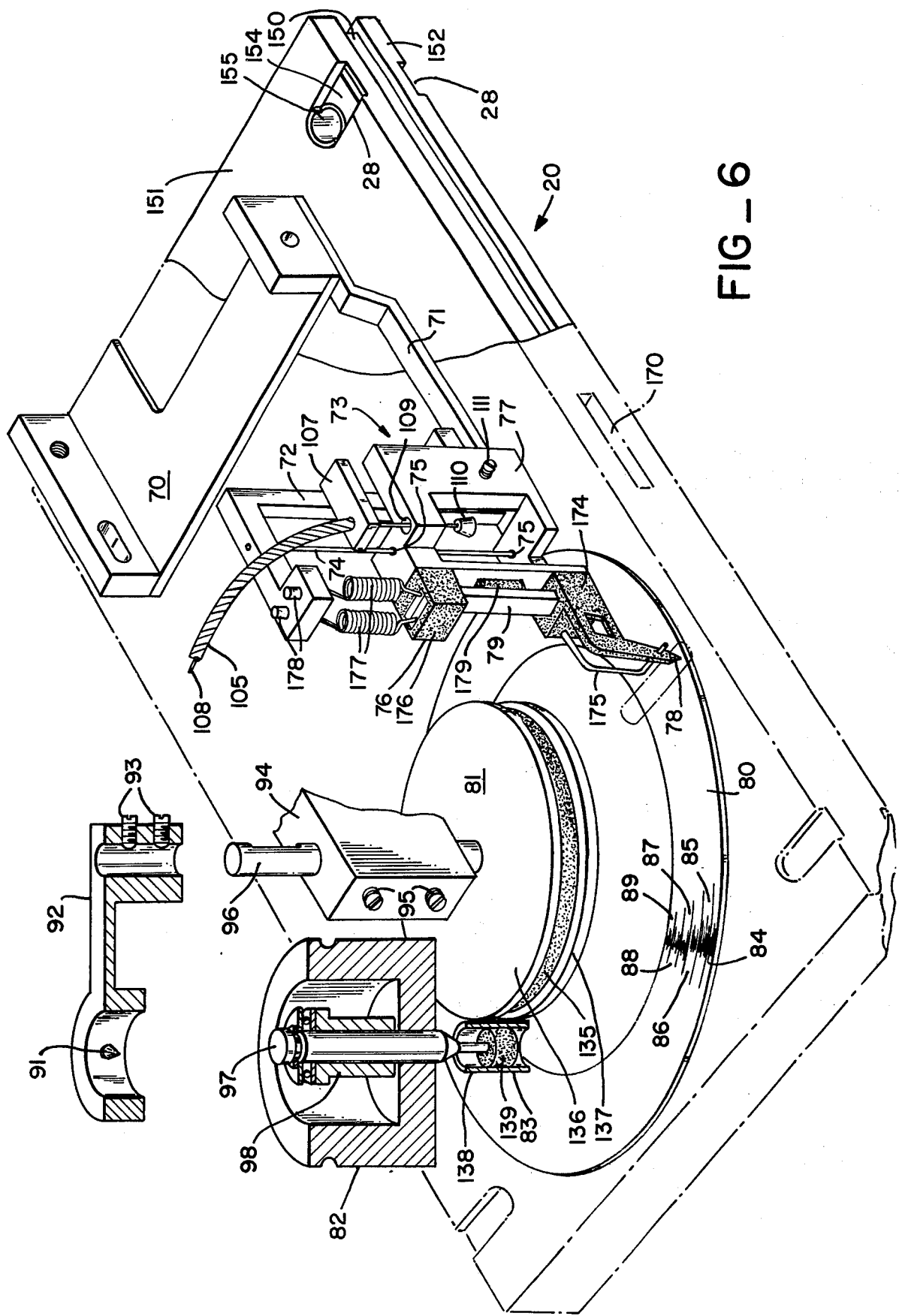
FIG_6

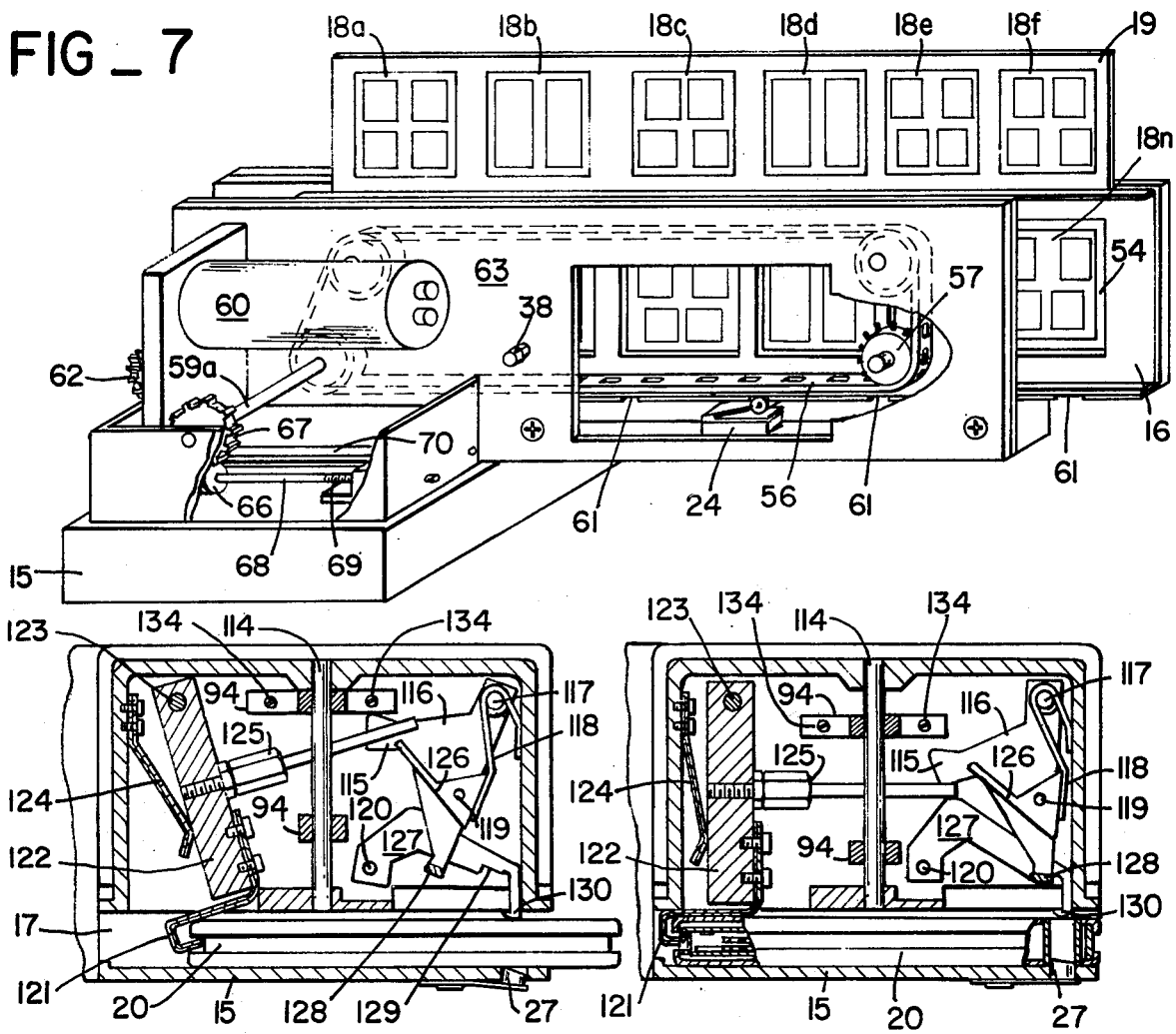
FIG_7
FIG_8  FIG_9
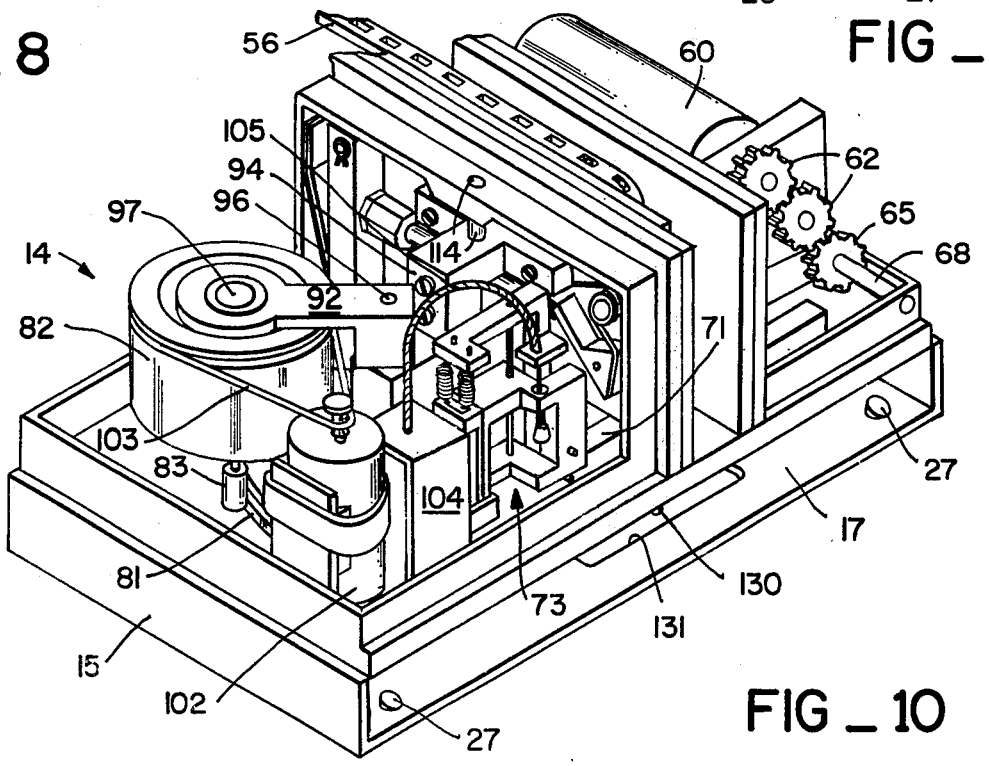
FIG_10

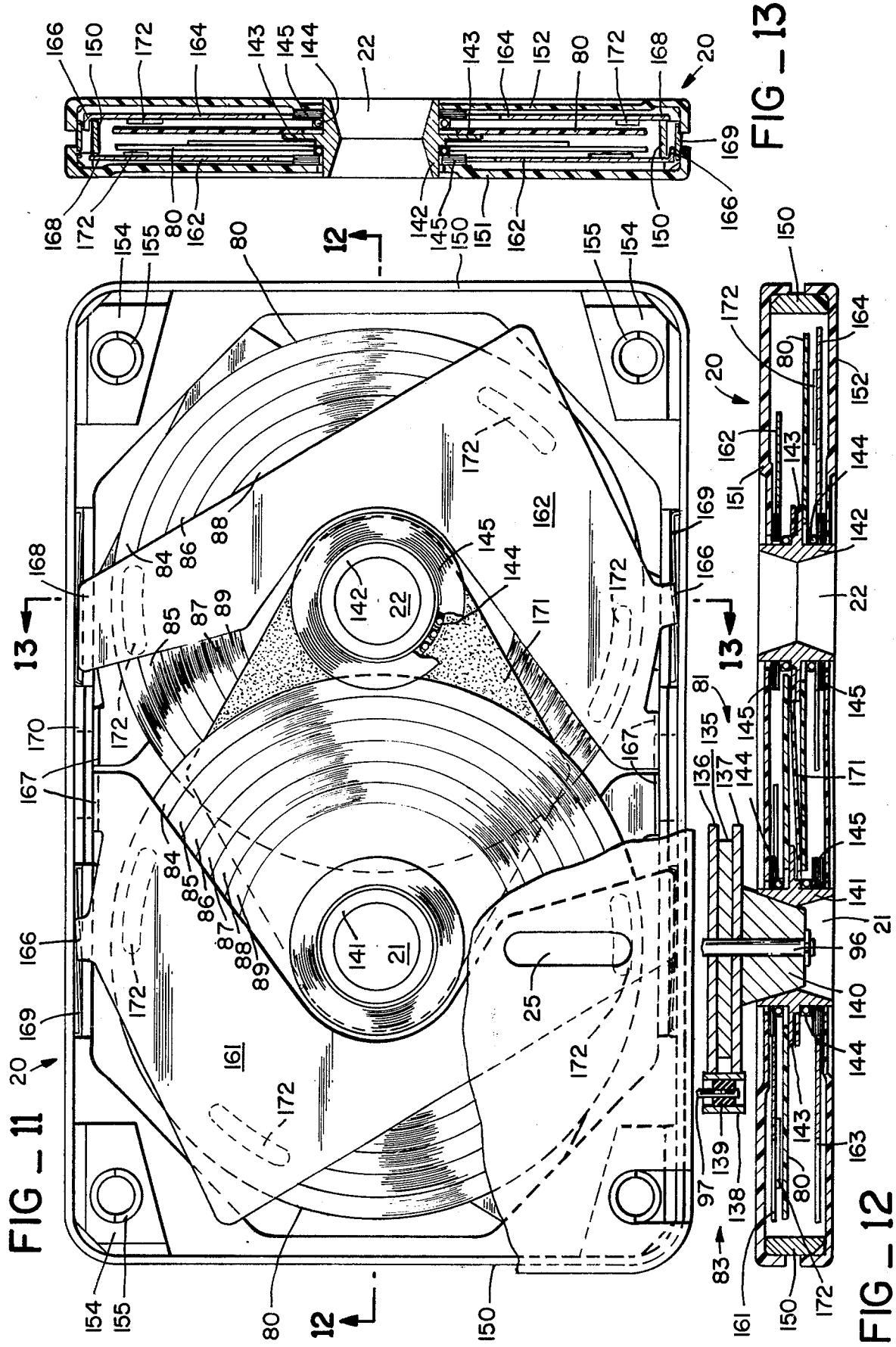

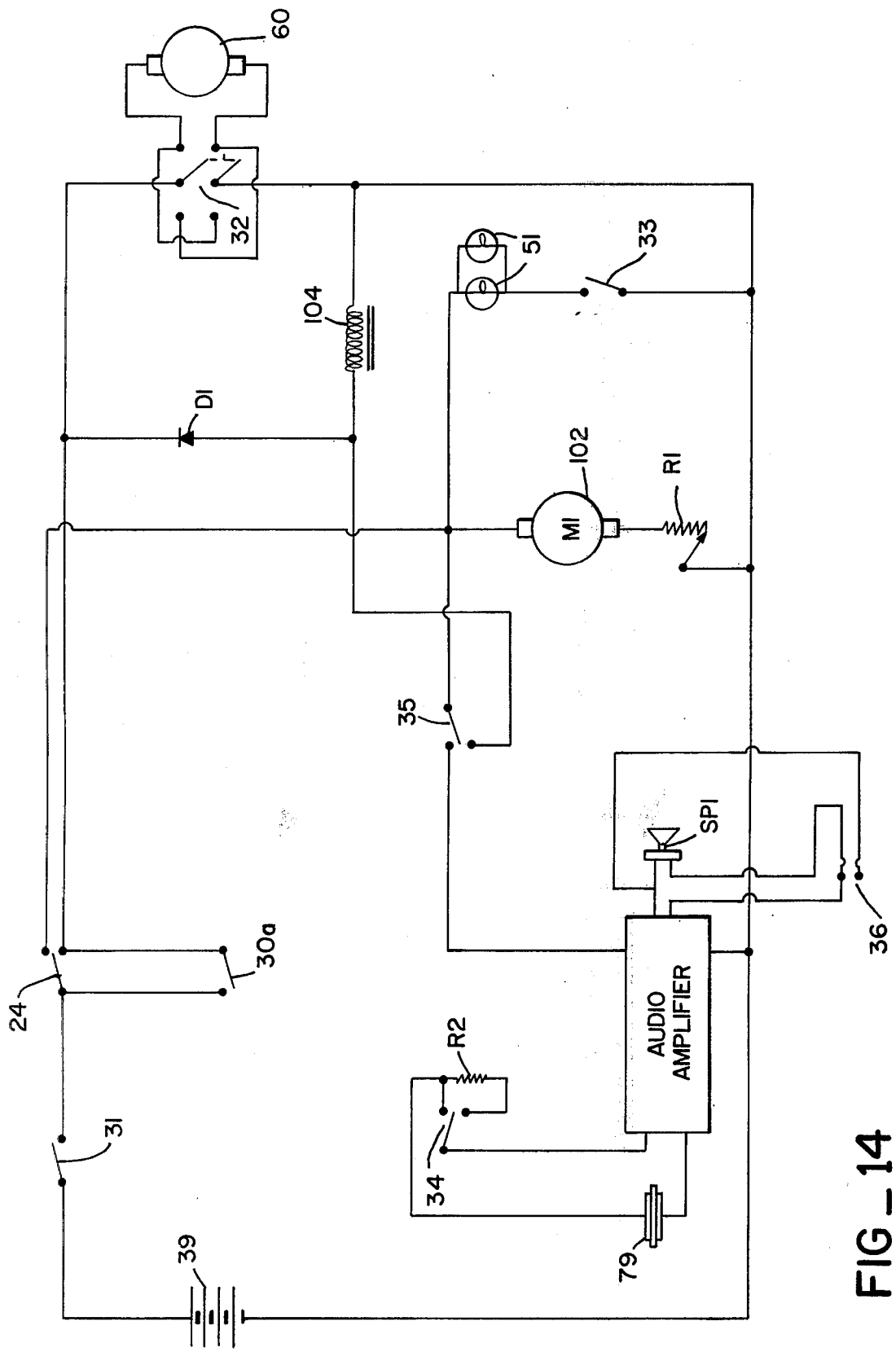
FIG_14

INTERACTIVE AUDIO-VISUAL APPARATUS

BACKGROUND OF THE INVENTION

This invention relates to audio-visual apparatus for the simultaneous viewing of photo-images and audio production of a lecture or commentary relating thereto and more particularly to such an apparatus which may be controlled by the user to select any one of a group of photo-images for viewing or to sequentially view the photo-images of such group in any desired order with the audio production of the lecture or commentary relating to each photo-image being automatically selected from a corresponding group of sound recordings.

The prior art provides apparatus of various kinds for the simultaneous viewing of photo-transparencies and audio production of sound associated therewith. The most crucial feature of any such apparatus is, of course, to obtain proper synchronization between the presentation of the photo-transparency for viewing and the production of the sound.

The apparatus used for presenting motion pictures with accompanying sounds is a well known example of the broad concept. However, it will be understood that such apparatus must be designed to present a large number of photo-transparencies in fixed sequence and rapid succession, each in conjunction with the production of a relatively short segment of sound from a sequentially recorded series of sounds or "sound track." In every instance a number of slightly different photo-transparencies will be presented in connection with sounds comprising a single word of human speech.

It is an object of this invention to provide apparatus in which an extended dialogue or portion of a lecture or commentary is produced in conjunction with the presentation of a single photo-image for extended viewing. Thus, techniques and apparatus suitable for the presentation of motion pictures with sound are not applicable in accomplishing the objects of this invention.

Others have designed apparatus for use in advertising or in the presentation of travelogues or for instructional purposes in which a series of photo-transparencies are presented for viewing in conjunction with the audio production of an extended segment of a recorded sound track comprising a dialogue, lecture or commentary. However, in such apparatus the synchronization between the sound track and the presentation of the photo-transparencies has been accomplished by providing for the sound track to control the presentation of the photo-transparencies in fixed sequence. See, for example, U.S. Pat. No. 3,048,083 to Rosenbaum.

The magnetic tape, of course, need not be endless as disclosed by Rosenbaum and in some devices of the general type the mechanism is not automatic. Instead, the control signal is produced as an audible sound to remind the operator to advance the photo-transparencies from one to the next in the fixed sequence.

Similar results have been obtained in apparatus of the type in which the dialogue, lecture, or commentary is recorded on conventional disc type records as described in U.S. Pat. No. 3,138,061 to Greenway, for example. In such apparatus, a control signal may be recorded on the disc and used in the same way as described above. However, as disclosed by Greenway, it is also possible to utilize the changing angular position of the tone arm as it moves across the record to control the presentation of the photo-transparencies in fixed sequence.

It is another object of this invention to provide apparatus of the type broadly described above in which the presentation of a photo-image from a group thereof automatically selects for production a particular portion of a sound track corresponding to such group of photo-images. Thus, prior art apparatus as disclosed by Rosenbaum and Greenway in which the sound track controls the presentation of the photo-transparencies is not applicable in accomplishing the objects of this invention.

It will be understood that in all apparatus of the prior art as discussed above, the presentation of the photo-transparencies and the production of sound must occur in a fixed time sequence. Thus, a certain amount of time is allowed for viewing each photo-transparency which amount of time is controlled by the sound track. In order to view a particular photo-transparency for a longer or shorter period of time than that allowed by the established time sequence, it would be necessary to interrupt the normal operation of at least the sound system of the apparatus thus tending to interfere with the synchronization between the sound track and the sequence of photo-transparencies.

U.S. Pat. No. 3,484,160 to Glass et al discloses an audio visual toy in which visual presentations may be viewed for any desired length of time independently of the audio presentation associated therewith. However, in using audio-visual apparatus of the type described above for instructional purposes, it is highly desirable that the person who seeks instruction be able to interact with the apparatus. If the user of the toy taught by Glass et al attempts to interact with the device by viewing the visual presentations out of their normal order, the synchronization between the visual presentation and the audio presentations will be destroyed.

In order to provide optimum interaction between the apparatus and the person seeking instruction from it, it is necessary that such person be able to control the sequence in which the photo-transparencies and the sound corresponding thereto are presented. It will be seen that in the apparatus of the prior art it is highly inconvenient, if not impossible, for the user to vary the order of the sequence of the presentation without destroying the synchronization between the sequence of the photo-transparencies and that of the sound track.

It is a still further object of this invention to enable full interaction between audio-visual apparatus of the type described and a person seeking instruction by providing apparatus which may be operated in a substantially random access mode under the control of such person.

It is often desirable to present two or more different things for comparative viewing in order to instruct persons as to similarities or differences between such things. It is also desirable that such things be clearly presented to the viewer and often desirable that they be presented stereoscopically so that differences or similarities in form may be seen. Finally, it is often desirable in such situations to direct the attention of the viewer first to one and then to another of two or more things presented for viewing.

It is another object of this invention to provide a stereoscopic viewing system based on the use of two identical views of a particular field of vision in order to provide clarity of view, apparent depth perception, and optical separation between fields of vision to facilitate comparative viewing of different things.

In order for audio-visual apparatus to be useful for instructional purposes, it is necessary that such apparatus be simple and convenient to operate, small, rugged and lightweight for portability, and inexpensive to manufacture and maintain. It is yet another object of this invention to provide apparatus of the type described based on the use of disc type records for sound recording which are mounted in rugged units for storage and use, whereby the mechanism of such apparatus is inexpensive to manufacture and maintain, small, lightweight and rugged for portability and convenient to operate.

SUMMARY OF THE INVENTION

The apparatus of this invention comprises means for sequentially presenting each of a plurality of photo-images for viewing and means for sequentially producing the audio rendition of each of a plurality of sound recordings all of which have a time duration greater than one second. According to this invention the apparatus also includes means for automatically correlating the beginning of the audio rendition of each one of the plurality of sound recordings with the beginning of the presentation of a different one of said plurality of photo-images for viewing and means for controlling the length of time during which each photo-image is presented for viewing, and the audio rendition of the sound recording correlated therewith is produced, independently of the time duration of said sound recording correlated therewith. The sound recordings are preferably made in disc type records although magnetic tape recordings could be used. The presentation of the photo-images is preferably stereoscopic and the photo-images are preferably directly viewed photo-transparencies although it would be possible to project photo-transparencies for indirect viewing and to use photographic prints rather than transparencies for direct stereoscopic viewing. The apparatus preferably includes a novel tone arm arrangement and a pair of disc type records for use with the apparatus are preferably mounted as a unit in a novel package. The apparatus also preferably includes a novel mechanism for receiving the record units and a novel drive mechanism for rotating the disc type records.

BRIEF DESCRIPTION OF THE DRAWING

The foregoing and other objects and features of the apparatus of this invention will be more fully appreciated when the following detailed description is read in conjunction with the drawing wherein:

FIG. 1 is a perspective view of an embodiment of the apparatus of this invention with a plurality of photo-images positioned therein for use but with the disc type record unit containing the sound recordings removed therefrom.

FIG. 2 is a perspective view of a disc type record unit suitable for use in the embodiment of the apparatus of this invention shown in FIG. 1, represented in position to be inserted into the embodiment of the apparatus of this invention as shown in FIG. 1.

FIG. 3 is a fragmentary view in elevation of the rear portion of the right end of the embodiment of the apparatus of this invention as shown in FIG. 1.

FIG. 4 is a schematic representation of the optical system of the embodiment of the apparatus of this invention shown in FIG. 1.

FIG. 5 is an exploded view in perspective of the embodiment of the apparatus of this invention shown in FIG. 1 with the outer coverings thereof either removed or shown in opened position to expose internal parts and with certain portions omitted for clarity.

FIG. 6 is an enlarged fragmentary view of the tone arm assembly and the record driving assembly of the embodiment of the apparatus of this invention shown in FIG. 1 with a portion of the record driving assembly represented in exploded form and with a disc type record shown in operating position and the cover of the disc type record unit of FIG. 2 shown in dotted lines.

FIG. 7 is a front perspective view of the embodiment of the apparatus of this invention shown in FIG. 1 with portions removed or broken away to expose the cooperating mechanism for the tone arm assembly and the slide viewer assembly thereof.

FIG. 8 is a fragmentary view, partially in cross-section and partially in elevation, of the record changing mechanism of the embodiment of the apparatus of this invention shown in FIG. 1 with the elements thereof in position immediately prior to the full insertion of the disc record unit of FIG. 2 therein, an end view of such disc record unit also appearing in FIG. 8.

FIG. 9 is a view similar to FIG. 8 but showing the disc record unit fully inserted and the elements of the record changing mechanism in the position corresponding thereto.

FIG. 10 is a fragmentary perspective view of the fully assembled record driving and tone arm module of the embodiment of the apparatus of this invention shown in FIG. 1 but with the cover removed to show the internal elements thereof.

FIG. 11 is an enlarged top view of the disc type record unit of FIG. 2 with the top cover thereof removed to expose the internal parts thereof.

FIG. 12 is a cross-sectional view taken along line 12—12 of FIG. 11 with the top cover thereof in place.

FIG. 13 is a cross-sectional view taken along lines 13—13 of FIG. 11 with the top cover thereof in place.

FIG. 14 is a representation of the electrical circuitry of the embodiment of this invention shown in FIG. 1, which representation is partly in schematic form and partly in block diagram form.

DESCRIPTION OF THE PREFERRED EMBODIMENT

Referring to FIG. 1 a preferred embodiment of the apparatus of this invention in the form of a fully assembled hand-held device is shown. According to this embodiment of the invention the apparatus is constructed of a series of modules according to the various functions which the apparatus must perform which modules are assembled on a frame. Thus, as shown in FIG. 1 the device 10 according to this embodiment of the apparatus of this invention comprises an optical module 11, an audio amplifier and power supply module 12, a synchronization module 13 and a sound track drive module 14. All of the above modules are physically mounted on a frame unit 15 as will be more fully described hereinafter and which frame unit 15 includes the photo-image slide carriage unit 16 and the sound track unit receptacle 17.

As shown in FIG. 1 the various photo-images 18a–18n may be mounted in an appropriate frame 19, however, it is also contemplated that such photo-images could be formed on a single strip of film material suitable for insertion into the slide transport member 16. As shown in FIG. 1 the photo-images 18a–18n may be arranged in two rows extending the length of the slide transport member 16. Although there are six photo-images in each row as shown in FIG. 1, it will be understood that more or less photo-images may be used as desired. It will also be understood that the row of photo-images 18a through 18f are not in operative position as shown in FIG. 1, whereas the second row comprising photo-images from 18g through 18n are in operative position and thus hidden from view within the device 10.

Referring to FIG. 2 a sound track unit 20 is shown in position for insertion into the receptacle 17 of the device 10. In the sound track unit 20 according to this embodiment of the invention, as broadly shown in FIG. 2, the sound track may be driven through a pair of apertures which are shown at 21 and 22. The sound track may be recorded on a pair of apertured discs mounted for rotary movement independently of each other within a housing 23, for example, in which case a pair of elongated apertures 25 and 26 are provided through such housing and each associated with a different one of such discs to provide access for the pickup unit of a tone arm (not shown in FIG. 1) to the sound recordings on such discs. It will be understood that other means of recording the sound track as by means of magnetic tape, for example, could be used in other embodiments of this invention.

As shown in FIGS. 1 and 2 the sound recordings on the disc associated with apertures 21 and 25 are correlated with the photo-images from 18f–18n and the sound recordings on the discs associated with apertures 22 and 26 are correlated with the photo-images 18a–18f. Thus, it will be understood that the orientation of both the slide 19 and the record unit 20 must be changed with respect to the device 10 in order to place the photo-images 18a–18f and the disc bearing the sound recordings correlated therewith, which disc is associated with apertures 22 and 26, into operative position. Such change in orientation is accomplished by removing the slide 19 and inverting it in the slide carriage member 16 and by removing the sound track unit 20 from the receptacle 17 and turning the unit 20 end-for-end for reinsertion to the receptacle 17. As shown in FIGS. 1 and 2 the sound track unit 20 may be held in receptacle 17 in any one of four orientations by the engagement of posts 27 at the entrance to the receptacle 17 with appropriate recesses 28 formed at the edges of both the upper and lower surfaces of the unit 20 as shown in FIG. 2.

The device 10 according to this embodiment of the apparatus of this invention is designed to enable it to be hand-held in use although it could also be mounted on a support (not shown). Thus, the device 10 is dimensioned so that the thumb of the left hand of the user may support the frame 15 under the receptacle 17 with the fingers of the left hand in contact with the top of the sound track driver module 14. Similarly, the thumb of the right hand of the user may support the frame 15 at the opposite end of the device 10 with the fingers of the right hand in contact with the top of the audio amplifier and power supply module 12.

As shown in FIG. 1 the front side of the optical module 11 is provided with a pair of eye pieces 41 and 42 with an indent 40 to accommodate the nose of the user. It will be understood that the optical module 11 and synchronization module 13 are lighter in weight than the audio amplifier and power supply module 12 and sound track drive module 14. Thus, the device 10 is confortably balanced when the hands of the user engage the device 10 toward the rear of the slide carriage unit 16 as shown in FIG. 1.

Referring to FIG. 3 a fragmentary view of the rear corner of the right side of the device 10 is shown in order to illustrate the type of controls which may be built into the audio amplifier and power supply module 12. It will be understood that such location of the controls will provide convenient access for manipulation by the right hand of the user when the unit is in operation.

The most important control from the standpoint of the user is a microswitch associated with the loudspeaker grille 30. As most clearly shown in FIG. 1 the loudspeaker grille 30 provides the upper surface for the right end portion of the audio amplifier and power supply module 12. Thus, the fingers of the right hand of the user of the unit normally rest lightly on top of the loudspeaker grille 30 when the device 10 is hand-held for use. According to this embodiment of the invention a normally open microswitch is mechanically associated with the loudspeaker grille 30 such that a squeezing action of the right hand of the user will force the loudspeaker grille downwardly to close the microswitch. As will be described more fully hereinafter the closing of the microswitch will activate appropriate circuitry to move the photo-image slide in either direction depending upon the setting of a further control. The circuitry is such that a momentary squeezing action will be sufficient to move the photo-image slide through a complete cycle from one photo-image to the next photo-image without further action by the operator. The circuitry is also such that the exertion of continuous pressure on the loudspeaker grille 30 by the hand of the operator will result in continuous movement of the photo-image slide.

Referring to FIG. 3 the other manual controls provided in the device 10 according to this embodiment of the apparatus of this invention may be a simple toggle or slide type switches. Thus, a single throw, single pole on-off switch 31 is provided to connect or disconnect the device 10 from the power supply thereof. Such power supply may comprise a set of 6 volt rechargeable nickle-cadmium batteries, for example. A double throw, double pole forward-reverse switch 32 is connected across the motor for driving the photo-image slide transport mechanism, thus enabling the operator to select the direction in which such mechanism will move. A single pole, single throw on-off switch 33 may be provided for connecting or disconnecting the power supply across an appropriate light source such as an incandescent lamp for illuminating the photo-image to be viewed. A single throw, double pole high-low switch 34 may also be provided to control the power output of the audio amplifier. Finally, a single pole, double throw audio on-off and reset switch 35 may be provided which, in its "off" position will automatically reset the audio portion of the device back to the beginning of a particular sound recording associated with a particular photo-image so that when the switch 35 returns to its "on" position, the audio presentation will be repeated.

As shown in FIG. 3 an earphone jack 36 may be provided for the insertion of the plug of an earphone type speaker (not shown). Such jack 36 may be of the type which automatically disconnects the audio amplifier from the loudspeaker located under the grille 30 at the same time that it makes connection to the earphone connected to the plug inserted in the jack 36.

The audio amplifier and power supply module 12 may be made in upper and lower sections joined by a hinge structure 37. As shown in FIG. 3, the audio amplifier is in the upper section and the power supply is in the lower section of module 12.

Referring to FIG. 4 the optically active elements of the optical module 11 together with a representation of a photo-image are shown. As indicated in FIG. 4 the optical system of this embodiment of apparatus according to this invention is a stereoscopic system. Thus, the eye pieces 41 and 42 include large aperture lenses which may be used by different persons without adjustment even though the spacing between the eyes of different persons may vary. The photo-image 18n comprises a left hand view and a right hand view. As shown in FIG. 4 the photo-image 18n comprises two different fields of vision. Thus, at the top of photo-image 18n a field of vision represented by left hand and right hand circular figures is shown and at the bottom of photo-image 18n a field of vision represented by left hand and right hand triangular figures is shown.

Considering first the top field of vision represented by the circles, it will be seen that the line of vision between the left eye of the observer and the left hand view of the field of vision passes through eye piece 41 to an outer inclined mirror 43 and from there to an inner inclined mirror 45. The inner inclined mirror 45 is spaced from the photo-image so as to exclude the right hand view of the field of vision from the left eye of the observer. Similarly, the line of vision for the right eye of the observer proceeds through the eye piece 42 to an outer inclined mirror 44 and from there to an inner inclined mirror 46 which is spaced from the photo-image 18n so as to exclude the left hand view of the field of vision from the right eye of the observer. Thus, the two fields of vision may be slightly different from each other in order to provide a stereoscopic effect.

However, it has been found that such optical system provides useful effects even where the images presented are images of planar objects such as charts or printed materials. Thus, as shown in FIG. 4 the upper views of the field of vision represented by the circles are separated from each other by a greater distance than the lower views of the field of vision represented by the triangles. It has been found that even where the two views of each field of vision are identical to each other the circle will appear to the observer to be further from the observer than the triangle. Thus, it has been found to be easier for the observer to focus his attention on one field of vision to the exclusion of the other. Furthermore, it has been found that when the field of vision is a printed page of material, it is easier for the observer to read such material from the photo-image.

From the above broad description of the unit 10 according to one embodiment of the apparatus of this invention, it will be understood that the main objective of the apparatus according to the teaching of this invention is to provide for optimum interaction between such apparatus and the user of the apparatus. Thus, as will be described more fully hereinafter, the user of the device 10 according to this invention may place a slide 19 of photo-images in the slide transport member 16 and a sound track unit 20 in receptacle 17 properly oriented to enable the reproduction of the sound recordings corresponding to the photo-images to be viewed. By proper manipulation of the controls 30–35, the operator may select any one of the photo-images of a particular row on the slide 19 for viewing and he will automatically hear the sound recording correlated therewith. He may interrupt the viewing and reproduction of the sound recording at any time to move on to another photo-image. He may go either forward or backward from one photo-image to the next and he may continue to observe a particular photo-image after the sound recording correlated therewith has been completely reproduced. He may also repeat the sound recording, or a portion thereof, associated with a particular photo-image while continuing to view such photo-image. Finally, by simple reorientation of the photo-slide 19 and the sound track unit 20, the operator may select any particular photo-image and sound recording associated therewith from a large number thereof. Thus, the unit 10 as shown in FIG. 1 will provide substantially random access to any one of 12 photo-images together with the sound recording corresponding thereto requiring only that the slide 19 be inverted and the sound record unit 20 be turned end for end and that the controls 30–35 be manipulated to bring a proper photo-image into view. Such operations may be quickly performed without the necessity for running any appreciable portion of the normal sequence which the unit is designed to provide in a semiautomatic program.

Referring to FIG. 5 an exploded view of the elements of the device 10 according to the embodiment of FIG. 1 are shown. The covers of the various modules have been removed or the modules opened in order to reveal certain internal parts thereof with other parts omitted for clarity. Thus, it will be seen that the frame 15 comprises an open sided hollow box providing the receptacle 17 for the sound track unit 20. A rigid elongated support plate 50 extends across the top of the hollow box member perpendicularly to the open side thereof and projects therefrom. Thus, the frame 15 comprising the hollow box and the plate 50 secured thereto form a rigid structure of substantially T-shape in top view. The plate 50 divides the upper surface of the hollow box into forward and rear portions with the projecting portion of the plate 50 providing forward and rear surfaces for the mounting of the optical module 11 and the audio amplifier and power supply module 12, respectively. As indicated in FIG. 5 the synchronization module 13 is mounted on the forward portion of the upper surface of the hollow box and the sound track drive unit 14 (the internal parts of which are omitted in FIG. 5) is mounted on the rear portion of the upper surface of the hollow box.

As most clearly shown in FIG. 5 the photo-image slide transport mechanism 16 is supported between the optical module 11 and the plate 50 by means of a plate 63 as described hereinafter. According to this embodiment of the invention the photo-images are transparencies and thus a light source comprising a pair of incandescent light bulbs 51 is provided in the audio amplifier and power supply module 12 together with a translucent plate 52 which forms the forward wall of such module. The support plate 50 is, of course, provided with an aperture 53 in registry with the light source and the translucent plate 52 as well as the optical module 11.

The photo-image slide transport member 16 comprises an elongated frame having a row of apertures 54 therethrough corresponding to the photo-images to be presented for viewing. It will be understood that a slide including a plurality of photo-images arranged in a row will be inserted in a slot 55 provided in the frame of the transport member 16 bringing the photo-images into registry with the apertures 54 through the frame of the transport member 16.

The transport member 16 is moved along between the forward face of the support plate 50 and the optical module 11 by means of a belt 56 and sprocket 57 arrangement. As shown in FIG. 5 the transport member 16 is fixed to a point on the belt 56 between the bight portions thereof as by means of a screw 58. Thus, rotation of the sprockets 57 will cause the belt to move in an endless fashion, moving the screw 58 and transport member 16 rectilinearly between the bight portions of the belt established by the sprockets 57. The sprockets 57 are mounted on axles 59 extending perpendicularly to the front surface of the plate member 50 and one of such sprockets may be driven by an appropriate motor 60 and gear train 62. As shown in FIG. 5 the motor 60 and gear train 62 are mounted on a plate 63 which plate is adapted to be rigidly fixed to the frame member 15, sandwiching the transport member 16, belt 56 and sprockets 57 between such plate 63 and the forward surface of the plate 50. It will be understood that when the plate 63 is mounted to the frame 15 as by means of screws 64 (only one of which is shown) the gear train 62 will engage a gear 65 located in the synchronization module and which is coupled to one of the sprockets 57 by means of a worm gear 66 which engages a gear 67 mounted on a common axle 59a with such sprocket 57. As will be more fully discussed hereinafter the gear 65 and work gear 66 are mounted on a common axle 68 which is elongated and provided with screw threads 69 at the end thereof opposite from the gear 65. Such screw threads 69 engage a threaded aperture in a tone arm slide member 70, thus enabling the position of the tone arm of the apparatus to be correlated with the positioning of a particular photo-image since both the photo-image slide transport member 16 and the tone arm slide member 70 are driven by the same motor 60 through the same gear train 62 and 65 as will be more fully described hereinafter.

As also shown in FIG. 5, the power supply for the device 10 according to this embodiment of the apparatus of this invention may comprise a plurality of batteries 39 mounted within the audio amplifier and power supply module which is shown in its open position to expose the batteries for replacement or recharging. The audio amplifier and power supply module may be affixed to the rear surface of the plate 50 by any suitable means such as by screws 29, for example. As also shown in FIG. 5, the optical module 11 may be attached to the plate 63 by means of two posts 38 having compressable ends thereon adapted to fit into cooperating apertures (not shown) formed in the module 11.

It will be understood that the sound track drive module 14 is mounted on the upper rear surface of the frame 15 in the space indicated by the reference numeral 14 in FIG. 5. Representation of the internal parts of sound track drive module 14 in FIG. 5 has been omitted for clarity and the operative elements thereof will now be described with reference to FIG. 6.

As shown in FIG. 6, the tone arm slide member 70 mentioned in connection with FIG. 5 is shown in the upper right hand portion. The tone arm 71 comprises a rigid elongated member mounted at one end on the tone arm slide member 70. The free end of the tone arm 71 is provided with a rigid bracket member 72 providing a substantially U-shaped mounting structure for the pickup unit 73. A pivot member 74 extends between the legs of the U-shaped supporting structure formed by the tone arm 71 and bracket 72 through apertures 75 formed in the pickup unit 73 and dimensioned to allow the pickup unit 73 to pivot freely about the pivot member 74.

As shown in FIG. 6, the pickup unit 73 comprises a first leg 76 projecting from the pivot member 74 in the direction in which the tone arm 71 extends and a second leg 77 projecting in the opposite direction from the first projection and offset therefrom to provide a counterweight about the axis of the pivot member 74. The second leg 77 thus projects along the tone arm 71 toward the tone arm slide member 70 and has a sufficient extent to contact the tone arm or the bracket member 72 or both, thus limiting pivotal movement of the pickup unit about the pivot member 74 in a counterclockwise direction. However, the pickup unit 73 is free to pivot about the pivot member 74 is a clockwise direction.

A novel structure including a needle 78 mechanically coupled to a piezo-electric crystal 79 is mounted on the free end of the first leg 76 of the pivot member 74 of the pickup unit 73, as shown. This structure, which will be more fully described hereinafter, provides the actual interface between the audio recording 80 and the audio amplifier of module 12.

In order to provide a more complete understanding of the operation of the tone arm 71 and pickup unit 73 a sound track unit 20 is shown, partly, in phantom, in FIG. 6 in operative position with respect to such tone arm 71 and pickup unit 73. One of the record discs 80 which is contained in the sound track unit 20 is shown in full in FIG. 6 with the needle 78 of the pickup unit 73 in operative engagement therewith. Similarly, a magnetic friction drive structure 81 driven by a flywheel 82 and magnetic pinion 83 is shown in operative engagement with the disc 80.

It will be understood from FIGS. 5 and 6 that the movement of the tone arm slide member 70 will tend to move the free end of the tone arm 71 and thus the needle 78 of the pickup unit 73 across the surface of the disc 80. Thus, when the needle 78 is raised from the upper surface of the disc 80 by means which will be more fully described hereinafter, movement of the tone arm slide member 70 will enable the needle 78 to be located at any particular point along a line extending radially from near the outer periphery of the disc 80 to a point adjacent the center of the disc 80.

According to this embodiment of the invention, a plurality of bands 84–89 of recorded material are provided on the upper surface of the disc 80, as shown in FIG. 6, each of such bands corresponding to one of the photo-images to be viewed in this embodiment of the apparatus of this invention. Thus, the movement of the tone arm slide member 70 is synchronized with the movement of the photo-image slide carriage unit 16 so that selection of a particular image for viewing will automatically select the one of the recorded bands 84–89 corresponding thereto.

Referring to FIG. 7, it will be seen that both the photoimage slide carriage unit 16 and the tone arm slide member 70 are driven by the motor 60 through the gear chain 62 which meshes with the gear 65 mounted on the axle 68. Thus, rotation of the axle 68 by the motor 60 through gear chain 62 and gear 65 will rotate the worm gear 66 which meshes with the gear 67 mounted on the axle 59a thereby imparting rotation to the axle 59a.

Referring to FIG. 5, it will be seen that rotation of the axle 59a will rotate the sprocket wheel 57 mounted thereon which sprocket wheel 57 engages the belt 56 to thereby drive the belt 56 and the photo-image slide carriage unit 16 attached thereto by means of screw 58. Similarly, rotation of the axle 68 will rotate the threads 69 thereof which engage the threaded aperture of the tone arm slide member 70, so that the photo-image slide carriage unit 16 and the slide member 70 move in synchronism.

Referring to FIG. 7, it will be seen that a microswitch 24 is mounted on the frame 15 in operative contact with the lower edge of the photo-image slide carriage unit 16. It will also be seen that the lower edge of the photo-image slide carriage unit is provided with a plurality of notches adapted to operatively engage the microswitch 24. It will be understood that each of the notches 61 is associated with a different one of the apertures 54 in the photo-image slide carriage unit 16. According to this embodiment of the invention, the microswitch 24 is a single pole, double throw switch for reasons which will be more fully described hereinafter.

FIGS. 8 and 9 show the mechanism for engaging and disengaging the sound track drive mechanism with the elements thereof in two different positions as will be explained more fully hereinafter. FIG. 10 is a perspective view of the sound track drive mechanism which will be more fully understood by considering FIGS. 6 and 10 together. The same reference numerals have been used in both FIGS. 6 and 10 to identify the same elements.

Thus, the flywheel 82 and pinion 83 are supported by means of an arm 92 (shown in exploded position in FIG. 6) with the magnetic pinion 83 in contact with the magnetic friction drive structure 81. The arm 92 and the magnetic friction drive structure 81 are both mounted on the sound track drive support slide 94 by means of a shaft 96. Referring to FIG. 6, it will be understood that the magnetic friction drive structure 81 is journalled on the end of the shaft 96 for rotation about the axis thereof. Similarly, it will be understood that the shaft 96 is fixedly held in the support slide 94 by means of set screws 95 and that the arm 92 is fixedly mounted on the extending end of the shaft 96 by means of set screws 93. The flywheel 82 and pinion 83 are provided with a common axle 97 which is journalled in a sleeve 98. The sleeve 98 is in turn rigidly mounted in an aperture in the arm 92 by means of set screws 91. Thus, it will be seen that the magnetic friction drive structure 81, flywheel 82 and pinion 83 may be raised and lowered as a unit by raising and lowering the support slide 94 as will be more fully described in connection with FIGS. 8 and 9.

As shown in FIG. 10, the flywheel 82 is driven by an electric motor 102 which is coupled to the flywheel 82 by means of a drive belt 103.

As also shown in FIG. 10, a solenoid 104 is mechanically coupled to the pickup unit 73 by means of a bowden wire or cable 105. The sheath of the bowden cable is rigidly fixed between the housing of the solenoid 104 and a plate 107 carried by the bracket 72 of the pickup unit 73. The central wire 108 of the bowden cable 105 is attached at one end to the plunger of the solenoid 104 and the other end of the central wire 108 of the bowden cable 105 extends through an enlarged aperture 109 in the second leg 77 of the pickup unit 73. The axis of the aperture 109 is parallel to the axis of the aperture 75 through which the pivot member 74 is received. After passing through the aperture 109, the central wire 108 of the bowden cable 105 terminates in a plug member 110 which tapers from a diameter smaller than aperture 109 adjacent the second leg 77 to a diameter larger than aperture 109. Thus, when the solenoid 104 is energized, it will pull on the central wire 108 of the bowden cable 105 drawing the plug 110 into the aperture 109 and thus simultaneously raising the pickup unit 73 and causing it to pivot in a counter-clockwise direction about the pivot member 74 until the set screw 111 in the second leg 77 of the pickup unit 73 contacts the bracket member 72 to limit such counter-clockwise motion of the pickup unit 73.

Referring to FIG. 14, a representation of the electrical interconnection of the elements of the device 10 partially in schematic form and partially in block diagram form is shown. Thus, it will be seen that the microswitch 24 associated with the slide carriage unit 16 and the microswitch 30a (not otherwise shown in the drawing) associated with the speaker grille 30 are connected in parallel with each other. The batteries 39 of the power supply of module 12 are connected across the drive motor 60 of the synchronization module through the on-off switch 31, the parallel connected microswtiches 24 and 30a and the forward-reverse switch 32. Similarly, the solenoid 104 is connected across the batteries 39 through the on-off switch 31, the parallel connected microswitches 24 and 30a and the diode D1 (not otherwise shown in the drawing). It will be understood that microswitches 24 and 30a are spring biased to be normally open with respect to the motor 60 and solenoid 104. Thus, if the on-off switch is closed, the closing of either microswitch 24 or 30a against its spring bias will energize the motor 60 and the solenoid 104. The direction of rotation of the motor 60 will be determined by the setting of the forward-reverse switch 32 and upon the closing of either microswitch 24 or 30a, the solenoid 104 will raise the pickup unit 73 and the motor 60 will drive the slide carriage unit 16 and tone arm slide 70 in the direction selected by the forward-reverse switch 32 in synchronism with each other.

As mentioned hereinabove the microswitch 24 is a single throw, double pole switch. Thus, as shown in FIG. 14 the battery 39 is connected across the drive motor 102 of the sound track drive module through the on-off switch 31, the normally closed pole of the microswitch 24 and a variable motor speed control resistor R1 (not otherwise shown in the drawing). The light bulbs 51 are connected across the motor 102 and resistor R1 through the lamp on-off switch 33 and the audio amplifier of the module 12 is connected across the motor 102 and resistor R1 through one pole of the audio on-reset switch 35. The other pole of the audio on-reset switch 35 is connected to the junction between the diode D1 and the solenoid 104.

The piezoelectric crystal 79 of the pickup unit 73 is connected to the input of the audio amplifier of module 12 through the single throw, double pole high-low audio switch 34. A resistor R2 (not otherwise shown in the drawings) is connected between the poles of the high-low audio switch 34.

The output of the audio switch amplifier of module 12 is applied to the speaker SP1 (not otherwise shown in the drawings) in parallel with the earphone jack 36. As mentioned hereinabove, the earphone jack 36 is of the type adapted to disconnect the speaker SP1 from the output of the audio amplifier when the plug of the earphone is inserted therein.

From the above, it will be understood that the audio amplifier of module 12, the light bulbs 51 and the sound track drive motor 102 are normally energized through the normally closed pole of microswitch 24 when the on-off switch 31 is turned on. The switches 33 and 35 may be operated to turn off the light bulbs 51 and audio amplifier of module 12, respectively. If the microswitch 30a is closed by exerting pressure on the grille 30 of the units as described hereinabove, the synchronization drive motor 60 and solenoid 104 will be energized lifting up the pickup unit 73 and causing movement of the slide carriage unit 16 and tone arm slide 70. As soon as the slide carriage unit 16 has moved sufficiently so that the actuation means of the microswitch 24 is no longer received in a notch 61 in the slide 16, the microswitch will be thrown to its normally open pole, thereby maintaining the energization of the synchronization drive motor 60 and solenoid 104 even though the microswitch 30a is subsequently allowed to return to its normally open position. Simultaneously, the sound track drive motor 102, light bulbs 51 and audio amplifier will be disconnected from the power supply by the microswitch 24. The synchronization drive motor 60 will continue to run until an adjacent notch 61 on the slide carriage unit 16 is brought into alignment with the actuation means of the microswitch 24 at which time the microswitch 24 will return to its normal position disconnecting the solenoid 104 and motor 60 from the power supply and connecting the light bulbs 51, motor 102 and audio amplifier to the power supply. It will be understood that the positions of the notches 61 in the slide carriage unit 16 are related to the apertures 54 in the slide carriage unit 16 in such a way that each of such apertures 54 will be aligned with the aperture 53 in the plate 50 when a different one of the notches 61 is in operative alignment with the actuation means of the microswitch 24. Thus, a photoimage 18 will be presented for viewing each time a notch 61 is in operative engagement with the actuation means of the microswitch 24 and will remain in such position unless and until the microswitch 30a is closed to restart the movement cycle of the carriage slide unit 16 and tone arm slide 70.

Referring to FIG. 14 and assuming that a photoimage is in position for viewing, the operation of the audio on-reset switch 35 from its "on" position to its "reset" position will be to turn off the audio amplifier of the module 12 by disconnecting it from the power supply and simultaneously connecting the solenoid 104 across the battery 39 in parallel with the sound track drive motor 102 and resistor R1. Under such circumstances the diode D1 prevents the synchronization drive motor 60 from being energized. The energization of the solenoid 104 will raise the pickup unit 73 and return it to its initial position with respect to the photoimage in view causing the portion of the sound track associated with that photoimage to be repeated from its beginning when the switch 35 is returned to the audio on-position.

The operation of the high-low audio switch 34 simply places the additional resistance of resistor R2 in, or removes it from, the input circuit of the audio amplifier of module 12, thus reducing the audio output thereof. It would, of course, be possible to provide a continuously adjustable resistance in the input circuit of the audio amplifier, however, it is believed that a high and low setting for such audio amplifier will prove satisfactory in normal use of the device of this invention.

The insertion and removal of the slides 19 carrying the photo-images 18 into the slot 55 of the slide carriage unit 16 is, of course, a simple and straightforward operation. However, the insertion and removal of the sound track unit 20 into the receptacle 17 and the engagement therewith of the sound track drive mechanism as well as the disengagement of the sound track drive mechanism from the sound track unit 20 and removal of the sound track unit 20 from the receptacle 17 is more complicated. FIGS. 8 and 9 show the mechanism for engaging and disengaging the sound track drive mechanism in two different positions, and FIGS. 11 through 13 show the structural details of a preferred embodiment of the sound track unit 20 according to this invention with the interface between the sound track drive mechanism and the sound track unit 20 being shown in FIG. 12.

Referring first to FIGS. 8 and 9, the sound track unit 20 is shown in the process of being inserted into the receptacle 17 in FIG. 8, and in FIG. 9 the sound track unit 20 is shown fully inserted in the receptacle 17 with the sound track drive mechanism operatively engaged therewith. The operative elements to be described hereinafter with respect to FIGS. 8 and 9 are mounted on the forward wall of the sound track drive module 14 as shown in FIG. 10. Thus, comparison of FIGS. 8 and 9 with FIG. 10 will be helpful although only a few of the reference numerals of FIGS. 8 and 9 are repeated in FIG. 10.

As shown in FIGS. 8 and 9 the drive mechanism support slide 94 comprises upper and lower legs mounted on a vertically extending shaft 114. The upper and lower ends of the shaft 114 are received in upper and lower flanges, respectively, of the housing for the sound track drive module 14, as shown. Thus, the support slide 94 is capable of movement up and down along the shaft 114 between the position shown in FIG. 8 when the upper leg of the support slide 94 is in contact with the upper flange of the module 14 and a position in which the upper leg of the support slide 94 is spaced from the upper flange of the module 14, as shown in FIG. 9. It will be understood, as explained hereinabove, that the magnetic friction drive structure 81 is carried up and down with the support slide 94, as is the flywheel 82 and pinion 83 carried by the arm 92 which is mounted on the support slide 94. Thus, when the support slide 94 is in the position shown in FIG. 8, the magnetic friction drive structure 81, flywheel 82 and pinion 83 are raised to disengage them from operative relationship with the sound track unit 20, and when the support slide 94 is in the position shown in FIG. 9 the magnetic friction drive structure 81, flywheel 82 and pinion 83 are in operative relationship with the sound track unit 20, as will be more fully described in connection with FIG. 12.

As can be seen in FIG. 10, the support slide 94 and magnetic friction drive structure 81, as well as the flywheel 82, pinion 83 and support arm 92 are all relatively massive. Thus, the weight of these elements is sufficient to urge the support slide 94 toward its lower position shown in FIG. 9 and insure effective engagement between the sound track drive mechanism and the sound track unit 20.

As shown in FIG. 8 the slide support member 94 is raised from its lower position by the engagement of the pawl 115 formed in the apex of the generally triangular pivot arm 116. As shown in FIG. 9 the base of the generally triangular pivot arm 116 extends generally vertically and the pivot arm 116 is mounted on a shaft 117 extending therethrough at the upper base angle thereof whereby the pivot arm 116 may be urged to pivot to the position shown in FIG. 8 by means of a coil spring 118 mounted on the shaft 117 with one end of the spring 118 bearing against a side flange of the module 14 and the other end of the coil spring 118 bearing on the pivot arm 116. It will be understood that the coil spring 118 must exert sufficient force on the pivot arm 116 to overcome the weight of the support slide 94 and the sound track drive mechanism mounted thereon, so that the support slide 94 will be maintained in the position shown in FIG. 8 when there is no sound track unit 20 in the receptacle 17.

When a sound track unit 20 is being inserted in the receptacle 17, as shown in FIG. 8, it will first engage a key hook 121 carried on the lower free end of an elongated pivot arm 122 which pivot arm 122 is mounted for pivotal movement about a shaft 123 extending therethrough at the upper end thereof. The pivot arm 122 is urged toward the position thereof shown in FIG. 8 by cantilever spring 124 having one end mounted on a side flange of the module 14 and the other end extending into contact with the pivot arm 122. When the sound track unit 20 is fully inserted in the receptacle 17 the pivot arm 122 will be moved to the position shown in FIG. 9 against the force of the spring 124 and the posts 27 at the entrance of the receptacle 17 will engage the recesses 28 in the housing 23 of the sound track unit 20 to hold the sound track unit 20 in the receptacle 17 against the force of the spring 124.

As will be more fully described hereinafter, the key hook 121 enters into an aperture in the sound track unit to open shutters which normally seal the tone arm apertures 25, 26 in the housing 23 of the sound track unit 20. Thus, the force exerted by the spring 124 not only tends to eject the sound track unit 20 from the receptacle 17 when the posts 27 are disengaged from the recesses 28, but also provides sufficient force for operation of the shutter mechanism of the sound track unit 20.

As shown in FIGS. 8 and 9 an elongated locking pin 125 projects from the pivot arm 122 toward the generally triangular pivot arm 116. The pivot arm 116 is provided with a one-way pivot pawl 126 which is mounted on the pivot arm 116 by means of a shaft 119. The pivot pawl 126 is adapted to pivot about the shaft 119 in a clockwise direction, but is restrained from pivoting about the shaft 119 in a counterclockwise direction. Thus, as shown in FIGS. 8 and 9, the spring 118 actually bears against the pivot pawl 126 of the pivot arm 116, thus, urging the pivot pawl 126 to rotate in a counterclockwise direction against its stop, and at the same time urging the pivot arm 116 toward the position shown in FIG. 8.

The pivot pawl 126 is provided with a projection of sufficient length to engage the free end of the locking pin 125 during an intermediate portion of the travel of such locking pin 125 from the position thereof shown in FIG. 8 to the position shown in FIG. 9. Thus, as the sound track unit 20 is inserted into the receptacle 17 pivoting the elongated pivot arm 122 about the shaft 123 against the force of spring 124, it causes the free end of the locking pin 125 to move downwardly engaging the projection on the pivot pawl 126 of the pivot arm 116. The locking pin 125 exerts a force on the projection of the pivot pawl 126 tending to force it to pivot in a counterclockwise direction. However, since the pivot pawl 126 is restrained from pivoting in a counterclockwise direction, such force is transmitted to pivot arm 116 causing it to rotate in a counterclockwise direction against the force of the spring 118 to the position thereof shown in FIG. 9. Such rotation of the pivot arm 116 removes the pawl 115 thereof from supporting relation with the lower side of the upper arm of the support slide 94, thus allowing the support slide 94 to move downwardly by the force of gravity to the position shown in FIG. 9.

A pivot arm 127 of inverted U-shape is mounted on a shaft 120 extending through the free end of one of its legs adjacent the lower base angle of the pivot arm 116, the pivot arm 116 being provided with a dog member 128 at its lower base angle which extends within the inverted U-shape of the pivot arm 127. It will be seen that the free end of the other leg of pivot arm 127 extends into the receptacle 17 and that a notch 129 for receiving the dog member 128 of the pivot arm 116 is provided in the pivot arm 127 adjacent such free end of the other leg member of the pivot arm 127.

Thus, when the locking pin 125 engages the pivot pawl 126 forcing the pivot arm 116 to rotate toward the position shown in FIG. 9, the dog member 128 on the pivot arm 116 will tend to raise the pivot arm 127 until the dog member 128 enters the notch 129.

The various members are dimensioned such that the engagement between the locking pin 125 and pivot pawl 126 will cease when the dog member 128 has entered the notch 125. Thus, the pivot arm 116 will be held in the position shown in FIG. 9 by the engagement of the dog member 128 of the pivot arm 116 with the notch 129 of the pivot arm 127. In this position the free end 130 of the other leg of the pivot arm 127 will project only slightly into the receptacle 17. Continued insertion of the sound track unit 20 into the receptacle 17 will rotate the pivot arm 122 and locking pin 125 to the position shown in FIG. 9 at which point the posts 27 engage the recesses 28 in the housing 23 of the sound unit 20, as described hereinabove.

As shown in FIG. 10, the bottom wall of the receptacle 17 is provided with an aperture 131 large enough to receive the fingers of the operator of the device. To release the sound track unit 20 from the receptacle 17 the operator pushes upwardly thereon through the aperture 131, thus simultaneously disengaging the posts 27 from the notches 28 and pushing upwardly on the free end 130 of the leg of the pivot arm 127 which projects into receptacle 17.

It will be seen that the pivot arm 127 will be caused to rotate in a counterclockwise direction when the sound track unit 20 is pushed upwardly in receptacle 17. Such rotation of the pivot arm 127 will cause the disengagement of the dog member 128 of pivot arm 116 from the notch 129 of pivot arm 127. Disengagement of the dog member 128 from the notch 129 will allow the spring 118 to force the pivot arm 116 to rotate in a clockwise direction bringing the pawl 115 into engagement with the underside of the upper arm of the support slide member 94 thereby raising the support slide member to disengage the sound track drive mechanism from the sound track unit 20.

When the sound track drive mechanism has been disengaged from the sound track unit 20, the spring 124 will cause the pivot arm 122 to rotate in a counterclockwise direction and the key hook 121 carried at the free end of the pivot arm 122 will tend to eject the sound track unit 20 from the receptacle 17 causing the sound track unit 20 to project from the receptacle 17 a sufficient distance to be grasped by the hand as shown in FIG. 8. As the pivot arm 122 rotates in a counterclockwise direction, the free end of the locking pin 125 will be brought into contact with the lower inclined surface of the pivot pawl 126. Such engagement will rotate the pivot pawl 126 in a clockwise direction allowing the free end of the locking pin 125 to pass the pawl 126 and return to the position shown in FIG. 8.

In order to insure that the sound track mechanism carried by the slide member 94 is properly centered over the sound track unit 20 for engagement and disengagement thereof, the upper arm of the support slide 94 is provided with a pair of nylon screws 134. Such nylon screws 134 pass through the upper arm of the support slide 94 and into contact with the vertical end wall of the module 14 upon which the pivot arm 116, 122 and 127 are mounted. Thus, by proper adjustment of the screws 134 the support slide 94 may be rotated about the axis of the shaft 114 and rigidly held in a particular radially extending position by the abutment between the screws 134 and the end wall of the module 14. Since the screws 134 are made of nylon they will offer minimum resistance to the sliding movement of the support slide up and down along the shaft 114 due to their contact with such end wall.

Referring to FIGS. 11 and 12, the engagement between the sound track drive mechanism and the sound track unit will be more fully understood. FIGS. 11 and 12 and 13 show the structural details of the sound track unit 20 and FIG. 12 includes a cross-sectional view of the magnetic friction drive structure and magnetic pinion in operative engagement with the sound track unit 20.

Referring first to FIG. 12 which will be more fully understood if considered in conjunction with FIGS. 6 and 10, it will be seen that the magnetic friction drive unit comprises an annular magnet 135 sandwiched between upper 136 and lower 137 pole pieces which pole pieces are in the form of circular discs. The magnetic pinion 83 comprises a cylinder 138 of magnetic material mounted on the end of the shaft 97 in contact with the peripheral surfaces of the pole pieces 136 and 137 by means of a resilient grommet 139. Thus, the magnetic cylinder 138 will be held firmly in contact with the peripheral surfaces of the pole pieces 136 and 137 by the magnetic force of the magnet 135. Rotation of the shaft 97 will rotate the cylinder 138 tending to impart rotation to the pole pieces 136 and 137. The resilient grommet 139 will provide for some degree of misalignment between the axis of the cylinder 138 and the axis of the shaft 97 produced by inaccuracies in the size or alignment of the peripheral surfaces of the pole pieces 136 and 137.

On the lower pole piece 137 is provided a sound track driving member 140 in the form of a truncated right circular cone having its base rigidly connected to the lower surface of the pole piece 137 and extending coacially with the structure 81 to its truncated apex. The magnet 135, pole pieces 136 and 137 and drive member 140 are all rigidly interconnected to form the magnetic friction drive structure 81 which is journalled on the lower end of the shaft 96 for rotation about the axis of such shaft 96 by the pinion 83.

As shown in FIGS. 12 and 13, the apertures 21 and 22 of the sound track drive unit 20 are each provided with a drive cylinder 141 and 142, respectively. According to this embodiment of the invention, the inner surface of each of such drive cylinders 141 and 142 form a pair of truncated right circular cones having their truncated apexes joined and their bases at opposite ends of the cylinder. The dimensions of the internal surfaces of the drive cylinders 141 and 142 and the external dimensions of the drive cone 140 are selected to enable the drive cone 140 to enter the drive cylinders 141 and 142 from either end thereof and engage such internal surface as shown in FIG. 12. Thus, it will be seen that rotation of the magnetic friction drive structure 81 about the axis of the shaft 96 will also tend to impart rotation to the drive cylinder 141 due to the contact between the conical exterior surface of the driving cone 140, and the conical interior surface of the drive cylinder 141.

According to this embodiment of the invention, as best shown in FIG. 11, the sound track is recorded on a pair of record discs 80, each of which is mounted on a different one of the drive cylinders 141 and 142. The drive cylinders 141 and 142, each of which carries a disc 80, are mounted for rotation within the sound track unit 20, as will now be described.

As best shown in FIGS. 11 and 12, the sound track unit 20 comprises a rigid frame 150 in the form of a hollow open-ended rectangular box. Flanged cover members 151 and 152, each of which is provided with apertures 21 and 22 for receiving the driving cone 140 as well as apertures 25 and 26 for receiving the needle 78 of the pickup unit 73, close the open ends of the box formed by the frame 150 with the record discs 80 and drive cylinders 141 and 142 sandwiched therebetween.

As best shown in FIGS. 6 and 11, the four corners of the frame 150 are provided with a reinforcing structure 154, each of which includes an eyelet 155. The eyelet 155 provides a convenient method for attaching the covers 151 and 152 to the frame 150 after the unit 20 has been fully assembled. The eyelet 155 also cooperates with the grooves 28 formed in the edges of the covers 151 and 152 to provide a socket for the posts 27 of the receptacle 17 in holding the unit 20 in the receptacle 17.

As best shown in FIGS. 12 and 13, each of the drive cylinders 141 and 142 is provided with a flange 143 which serves both as the means of mounting a record 80 on such drive cylinder and as the means of mounting the drive cylinders 141 and 142 between the covers 151 and 152. It will be seen that such flange 143 is displaced slightly toward one end of the cylinders 141 and 142. Thus, by inverting the cylinders with respect to each other, the records 80 mounted on the flanges 143 of the respective cylinders will be positioned at different levels within the unit 20 so that such records 80 may overlap each other, as best shown in FIG. 11. The flanges 143 of the drive cylinders 141 and 142 may be sandwiched between ball bearings 144, which are in turn sandwiched between appropriate shims 145, which abut the adjacent inner surfaces of the cover members 151 and 152.

Also sandwiched between the covers 151 and 152 are mounted on the frame 150 are four shutter members 161, 162, 163 and 164. A first pair of shutter members 161, 163 are located on opposite sides of the record disc 80 associated with the driving cylinder 141 and a second pair of shutter members 162 and 164 are located on opposite sides of the record disc 80 associated with driving cylinder 142.

It will be understood that the record discs 80 have recording grooves formed on both of their surfaces in bands 84–89, as described hereinabove. Thus, each of the shutters 161 and 163 are associated with an aperture 25 through a different one of the cover plates 151 and 152 which provides access to one of the sides of the disc 80 associated with the drive cylinder 141. Similarly, each of the shutter members 162 and 164 are associated with one of the apertures 26, which provides access to one of the sides of the record disc 80 associated with the driving cylinder 142.

As best shown in FIG. 11, the shutters 161–164 extend across the width of the sound track unit 20 and are relieved at their center to accommodate the driving cylinders 141 and 142, ball bearings 144, and shims 145. One end of each shutter 161–164 is provided with a pair of down-turned flanges 166 and 167. As best shown in FIG. 13, one of the flanges 166 is received over the sidewall of the frame 150 and the other end 168 of the shutter rests on top of the sidewall of the frame member 150. The downwardly extending flange 166 is compressively held against the frame member 150 by a spring member 169 mounted between flanges on the cover members 151 and 152. The flanges 167 on shutter members 161 and 164 are located adjacent each other inside the frame member 150 and opposite an aperture 170 which extends through the sidewall of the frame member 150. Such aperture 170 is best shown in FIGS. 2, 6 and 9.

Referring specifically to FIG. 9, it will be seen that when the sound track unit 20 is inserted into the receptacle 17, the key hook 121 mounted on the end of the pivot member 122 will enter the aperture 170 through the sidewall of the frame 150 which is presented to it. Entry of the key hook 121 into the aperture 170 will bring it into abutment with the flanges 167 on either shutters 161 and 164 or 162 and 163 depending upon the orientation of the sound track unit 20. Due to such abutment, the two shutter members involved will be caused to pivot about the flange 166 in opposition to the spring 169, thus causing the opposite end 168 of the shutter members to slide along the top of the frame 150 toward opposite ends thereof. Such movement of the shutter members will clear the apertures 25 on opposite sides of the sound track unit 20 thereby providing access through upper one of such apertures for the needle 78 of the pickup unit 73 to contact the surface of one of the record discs 80. It will be understood that the other two apertures 26 will remain closed. The purpose of this arrangement is, of course, to exclude dust and dirt from the interior of the sound track unit 20 when it is not in use. Thus, the spring 169 biases the shutter member 161-164 toward their closed position, except when the key hook member 121 is in compressive contact with the flanges 167.

It should be pointed out that a teflon strip 171 is interposed between the overlapping portions of the record discs 80 in order to avoid abrasive contact therebetween when the unit is in operation. Similarly, teflon pads 172 are provided on the surfaces of the shutter members 161–164 adjacent to record discs 80. Such teflon pads prevent abrasive damage to the recorded surfaces on the record discs 80 is they should be brought into contact with the shutter members 161–164 in operation. The teflon strip 171 and the teflon pads 172 also reduce any frictional drag that might otherwise result from contact between the record discs 80 themselves or between the record discs 80 and the shutter members 161–164.

Referring again to FIG. 12, it should be pointed out that if the cone drive member 40 and the drive cylinders 141 and 142 are both made of magnetic material, it may be possible to dispense with the roller bearing mounting of the drive cylinders 141 and 142. In other words, the magnetic field of the magnet 135 could be used to support the drive cylinder 141 and 152 in proper position by properly locating the cone drive member 140 with respect to the sound track unit 20 and allowing such magnetic field to hold the selected one of the drive cylinders 141 and 142 against the driving surface of cone drive member 140. In any event, the magnetic field would tend to increase the frictional engagement between the cone drive member 140 and the drive cylinders 141 and 142.

Referring again to FIG. 6, the audio coupling between the needle 78 and the crystal 79 of the pickup unit 73 according to this embodiment of the invention is provided by members 174 and 176 of resilient material capable of conducting the mechanical oscillations, imparted to needle 78 by the grooves in the record disc 80, from the needle 78 to the crystal 79 which is embedded in members 174 and 176. The members 174 and 176 are mounted on the free end of the first leg 76 of the pickup unit 73 and member 174 is provided with a right angle projection carrying the needle 78 at its free end as shown. A transverse stiffening member 175 may be provided in parallel with the right angle projection of the member 174 in order to resist the relatively constant transverse tracking force exerted on the needle 78 by the grooves in the record disc 80 in rotating the pickup unit 73 about pivot member 74 as the sound recording is reproduced.

A pair of helical springs 177 of fine electrically conductive wire are electrically connected between the piezoelectric crystal 79 and a pair of electrical terminals 178 insulatingly mounted on the bracket member 72. Appropriate electrical wires (not shown) are connected between the terminals 178 and the audio amplifier of the module 12 to conduct the output of the crystal 79 to the amplifier.

The helical springs 177 are designed to offer minimum resistance to the vertical movement of the pickup unit 73 with respect to the bracket 72 as well as to the rotational movement of the pickup unit 73 about pivot member 74. A damping member 179 of resilient material may be mounted between the crystal 79 and the free end of the first leg 76 of pickup unit 73 in order to further isolate the crystal 79 from extraneous vibrations inherent in the operation of the mechanism associated therewith.

It should be pointed out that according to the preferred embodiment of this invention, the dimensions of the device 10 are selected so that two slides 19 each including two rows of six photoimages 18 are associated with a sound track unit 20 capable of providing a total of about two hours of audio output and having dimensions approximately equal to the dimensions of one of such slides 19 when folded in half transversely. Thus, 24 photo-images are associated with a sound track unit 20, each row of six photo-images being associated with a different one of the four possible orientations of the sound track unit, and about 5 minutes of audio output being available for each photo-image. The slides 19 may be folded in half and placed with the sound track unit 20 for convenient storage in a common container. Appropriate indicia may be provided on the slides 19 and sound track unit 20 to facilitate proper correlation between each row of photo-images and the corresponding orientation of the sound track unit in inserting them into the device 10.

From the above, it will be seen that a novel audio-visual device providing for optimum interaction between the device and a user thereof has been provided. The specific embodiment of the device described hereinabove includes many novel features all of which cooperate with each other to provide the desired end results. However, it is contemplated that those skilled in the art may make various obvious modifications and changes in the specific elements of the embodiment of this invention as disclosed herein without departing from the teaching of this invention.

For example, a projection type optical system could be substituted for the direct viewing optical system disclosed hereinabove with all other modules of the device remaining the same. It would, of course, be necessary to use a different light source as well as a different lens system and the stereoscopic effect would be more difficult to provide in a projection system.

What is claimed is:

1. Audio-visual apparatus comprising:
   a. means for presenting each of a plurality of photo-images for viewing in either of two opposite sequences, including a light source and first mechanical means for bringing each of said photo-images into operative juxtaposition with said light source in sequential order;
   b. means for producing the audio rendition of each of a plurality of sound recordings having a given time duration in excess of one second in either of two opposite sequences each correlated with a different one of said two opposite sequences for viewing said photo-images, comprising means for automatically correlating the beginning of the audio rendition of each one of said plurality of sound recordings with the beginning of the presentation of a different one of said plurality of photo-images for viewing including a transducer head for producing audio renditions of said plurality of sound recordings, said plurality of sound recordings being recorded in spaced relation on a single continuous substrate in sequential order corresponding to said sequential order of said photo-images to provide means for automatically terminating said audio rendition at the end of said given time duration of each of said plurality of sound recordings;
   c. means for selecting one of said two opposite sequences for viewing said photo-images; and
   d. means for controlling the length of time during which each photo-image is presented for viewing and the audio rendition of the sound recording correlated therewith is produced independently of said time duration of the one of said plurality of sound recordings correlated therewith;
   said means for automatically correlating the beginning of the audio rendition of each one of said plurality of sound recordings with the beginning of the presentation of a different one of said plurality of photo-images for viewing including second mechanical means controlled by said first mechanical means for bringing said transducer head into operative juxtaposition with the beginning of each of said plurality of sound recordings in said sequential order; said means for controlling the length of time during which each photo-image is presented for viewing including an automatic control means for stopping said first mechanical means when a photo-image is in operative juxtaposition with said light source and a manually operable control means for starting said first mechanical means when a photo-image is in operative juxtaposition with said light source, said manually operable control means being capable of overriding said automatic control means; and said means for producing said audio rendition of each of said plurality of sound recordings including means for providing relative movement of said transducer head with respect to each one of said plurality of sound recordings independently of said first and second mechanical means but responsive to said manually operable control means to interrupt said audio rendition of said sound recording when said manually operable control means is actuated, whereby said automatic correlation and said automatic termination is the same for either of said two opposite sequences for viewing said photo-images.

2. Audio-visual apparatus as claimed in claim 1 wherein said plurality of sound recordings are recorded in circular bands on one surface of a disc type substrate and said transducer head is a pickup unit pivotally mounted on the end of a rigid tone arm movable by said second mechanical means along a line extending between a point adjacent the outer periphery of said disc type substrate and a point adjacent the center of said disc type substrate.

3. Audio-visual apparatus as claimed in claim 2 wherein a pair of disc type substrates each having said sound recordings on both surfaces thereof are independently mounted as a unit within a common housing and with the centers thereof spaced from each other in a common plane, whereby said unit may be oriented in four different positions to enable the independent rendition of the sound recordings on both sides of each of said pair of disc type substrates.

4. Audio-visual apparatus comprising:
   a. means for presenting each of a plurality of photo-images for viewing in either of two opposite sequences including a light source and first mechanical means for bringing each of said photo-images into operative juxtaposition with said light source in a given sequential order;
   b. means for producing the audio rendition of each of a plurality of sound recordings having a given time duration in excess of one second in either of two opposite sequences each correlated with a different one of said two opposite sequences for viewing said photo-images including means for automatically correlating the beginning of the audio rendition of each one of said plurality of sound recordings with the beginning of the presentation of a different one of said plurality of photo-images for viewing and means for automatically terminating said audio rendition at the end of said given time duration of each of said plurality of sound recordings which automatic correlation and automatic termination is the same for either of said two opposite sequences for viewing said photo-images;
   c. means for selecting one of said two opposite sequences for viewing said photo-images; and
   d. means for controlling the length of time during which each photo-image is presented for viewing and the audio rendition of the sound recording correlated therewith is produced independently of said time duration of the one of said plurality of sound recordings correlated therewith including automatic control means comprising means for sensing indicia associated with a photo-image and generating an electrical signal in response thereto for stopping said first mechanical means when a photo-image is in operative juxtaposition with said light source and a manually operable control means for starting said first mechanical means when a photo-image is in operative justaposition with said light source, said manually operable control means being capable of overriding said automatic control means.

5. Audio-visual apparatus as claimed in claim 4 wherein said automatic control means is a microswitch and said indicia is a physical element associated with said photo-image and adapted to actuate said microswitch.

6. Audio-visual apparatus as claimed in claim 5 wherein said photo-images are mounted in a carrying frame for movement by said first mechanical means in said apparatus.

7. Audio-visual apparatus as claimed in claim 4 wherein said means for sequentially presenting each of a plurality of photo-images for viewing includes a stereoscopic optical system and each of said photo-images include two spaced views of a field of vision.

8. Audio-visual apparatus as claimed in claim 7 wherein said two views of a field of vision of one of said photo-images are identical.

* * * * *